US012353651B2

United States Patent
Wu et al.

(10) Patent No.: US 12,353,651 B2
(45) Date of Patent: Jul. 8, 2025

(54) METHOD AND DEVICE FOR PREDICTING DRAWN POINT OF STYLUS

(71) Applicant: Huawei Technologies Co., Ltd., Shenzhen (CN)

(72) Inventors: Da Wu, Shanghai (CN); Yedong Wang, Shanghai (CN); Rui Yan, Shenzhen (CN); Feng Sun, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/778,622

(22) PCT Filed: Nov. 23, 2020

(86) PCT No.: PCT/CN2020/130866
§ 371 (c)(1),
(2) Date: May 20, 2022

(87) PCT Pub. No.: WO2021/098878
PCT Pub. Date: May 27, 2021

(65) Prior Publication Data
US 2022/0413637 A1 Dec. 29, 2022

(30) Foreign Application Priority Data

Nov. 22, 2019 (CN) ......................... 201911155366.5
Sep. 30, 2020 (CN) ......................... 202011058380.6

(51) Int. Cl.
*G06F 3/0354* (2013.01)
*G06F 3/038* (2013.01)
(Continued)

(52) U.S. Cl.
CPC .......... *G06F 3/03545* (2013.01); *G06F 3/038* (2013.01); *G06F 3/04883* (2013.01); *G06N 5/022* (2013.01)

(58) Field of Classification Search
CPC .. G06F 3/03545; G06F 3/038; G06F 3/04883; G06F 3/03547; G06F 3/0383; G06F 3/0346; G06N 5/022; G06Q 10/04
See application file for complete search history.

(56) References Cited

U.S. PATENT DOCUMENTS 5,229,551 A * 7/1993 McDermott ........ G06F 3/04182
178/18.02
5,837,947 A * 11/1998 Teterwak .............. G06F 3/0443
345/173
(Continued)

FOREIGN PATENT DOCUMENTS

| CN | 102622120 A | 8/2012 |
| CN | 102622127 A | 8/2012 |

(Continued)

OTHER PUBLICATIONS

Mathieu Nancel et al, "Next-Point Prediction Metrics for Perceived Spatial Errors", In Proceedings of the 29th Annual Symposium on User Interface Software and Technology, pp. 271-285. Oct. 16, 2016, total 15 pages, XP058299722.

*Primary Examiner* — Bryan Earles
(74) *Attorney, Agent, or Firm* — Conley Rose, P.C.

(57) ABSTRACT

A method for predicting a drawn point of a stylus includes obtaining a plurality of reported points of a stylus, determining a reported point prediction model based on the reported points, performing prediction using the reported point prediction model to obtain at least one predicted point, and drawing the at least one predicted point and displaying the drawn predicted point.

20 Claims, 4 Drawing Sheets (51) Int. Cl.
*G06F 3/04883* (2022.01)
*G06N 5/02* (2023.01)
*G06N 5/022* (2023.01)

(56) References Cited

U.S. PATENT DOCUMENTS

| | | | | |
|---|---|---|---|---|
| 5,877,743 | A * | 3/1999 | Dzik | G06T 11/203 345/611 |
| 5,995,081 | A * | 11/1999 | Kato | G06T 11/203 345/174 |
| 7,623,998 | B1 * | 11/2009 | Yu | G06T 11/203 703/2 |
| 9,529,525 | B2 * | 12/2016 | Skaljak | G06T 1/60 |
| 9,606,656 | B2 * | 3/2017 | Yeh | G06F 3/04186 |
| 10,261,685 | B2 * | 4/2019 | Deselaers | G06F 3/0418 |
| 10,942,646 | B2 * | 3/2021 | Poon | G06N 5/022 |
| 11,853,486 | B2 * | 12/2023 | Wong | G06F 3/03545 |
| 2003/0025713 | A1 * | 2/2003 | Wang | G06T 11/203 382/241 |
| 2008/0256155 | A1 * | 10/2008 | Hayes | G06T 17/30 708/290 |
| 2012/0050293 | A1 * | 3/2012 | Carlhian | G06T 11/203 345/442 |
| 2012/0194444 | A1 | 8/2012 | Chang et al. | |
| 2012/0206380 | A1 | 8/2012 | Zhao et al. | |
| 2012/0256944 | A1 * | 10/2012 | Crumly | G06V 30/1423 345/611 |
| 2013/0021272 | A1 * | 1/2013 | Wang | G06F 3/0416 345/173 |
| 2013/0136377 | A1 * | 5/2013 | Luo | G06T 11/60 382/275 |
| 2013/0271487 | A1 * | 10/2013 | Lincoln | G06F 3/0488 345/157 |
| 2015/0091832 | A1 | 4/2015 | Mizunuma et al. | |
| 2015/0355778 | A1 * | 12/2015 | Kim | G06F 3/0416 345/173 |
| 2016/0357391 | A1 | 12/2016 | Nilo et al. | |
| 2017/0153768 | A1 | 6/2017 | Yeh | |
| 2018/0373392 | A1 | 12/2018 | Murakami | |
| 2019/0155498 | A1 * | 5/2019 | Angelov | G06F 3/0447 |
| 2019/0302985 | A1 | 10/2019 | Zhong et al. | |
| 2019/0310738 | A1 * | 10/2019 | Dyvik | G06F 3/0418 |

FOREIGN PATENT DOCUMENTS

| | | |
|---|---|---|
| CN | 103049188 A | 4/2013 |
| CN | 103105957 A | 5/2013 |
| CN | 103403665 A | 11/2013 |
| CN | 107273130 A | 10/2017 |
| CN | 107436700 A | 12/2017 |
| CN | 108475134 A | 8/2018 |
| CN | 108885536 A | 11/2018 |

* cited by examiner

METHOD AND DEVICE FOR PREDICTING DRAWN POINT OF STYLUS

CROSS-REFERENCE TO RELATED APPLICATIONS

This is a U.S. National Stage of International Patent Application No. PCT/CN2020/130866 filed on Nov. 23, 2020, which claims priority to Chinese Patent Application No. 201911155366.5 filed on Nov. 22, 2019 and Chinese Patent Application No. 202011058380.6 filed on Sep. 30, 2020. All the aforementioned applications are hereby incorporated by reference in their entireties.

TECHNICAL FIELD

This application relates to the artificial intelligence (artificial intelligence, AI) application field, and in particular, to a method for predicting a drawn point of a stylus and a stylus.

BACKGROUND

Currently, a stylus is a most commonly used accessory of a tablet computer, and is usually used in scenarios such as drawing and taking notes during working. However, due to some inherent features of the stylus and the tablet computer, there is a difference between experience of writing on the tablet computer by using the stylus and experience of writing on paper by using an ordinary pen. When the stylus is used to write on the tablet computer, there is inevitably a specific latency because touch control, point reporting, and drawing need to be processed and calculated by the device. It is clear that if the latency is relatively high, when a user uses the stylus to write on the tablet computer, the user may see that a point displayed on a screen of the tablet computer does not overlap with an actual writing location of the stylus, and there is a specific distance between the displayed point and the actual writing location. For user experience, this means that the stylus does not follow a hand well during writing. This severely affects user experience.

SUMMARY

Embodiments of this application provide a method for predicting a drawn point of a stylus. In the method, a location of a future reported point is predicted based on information about historical reported points, and a predicted point is drawn, so that the drawn and displayed point can be closer to a location of an actual touch point of the stylus than an actual reported point. This ensures that a user can have better hand-following and handwriting experience when using the stylus.

According to a first aspect, a method for predicting a drawn point of a stylus is provided. The method includes: obtaining a plurality of reported points of a stylus, determining a reported point prediction model based on the plurality of reported points; performing prediction by using the reported point prediction model to obtain at least one predicted point; and drawing the at least one predicted point and displaying the drawn predicted point. In embodiments of this application, the reported point prediction model is constructed based on information about historical reported points to obtain the predicted point. The predicted point is drawn and displayed, so that the displayed point is closer to a location of an actual touch point of the stylus than an actual reported point. This ensures that a user can have better hand-following and handwriting experience when using the stylus.

In a possible implementation, the determining a reported point prediction model based on the plurality of reported points includes: determining coordinate information and time information of the plurality of reported points, where the coordinate information includes coordinate information in an X-axis direction and coordinate information in a Y-axis direction; and for each of the X-axis direction and the Y-axis direction, obtaining the reported point prediction model in the direction based on coordinate information of the plurality of reported points in the direction and the time information.

In a possible implementation, the performing prediction by using the reported point prediction model to obtain at least one predicted point includes: for each of the X-axis direction and the Y-axis direction, determining coordinate information of n predicted points in the direction based on the reported point prediction model in the direction, where n is a positive integer; and obtaining coordinate information of the n predicted points based on the coordinate information of the predicted points in the X-axis direction and the coordinate information of the predicted points in the Y-axis direction.

In a possible implementation, the method further includes: determining a movement speed of the stylus based on the plurality of reported points; determining an error between the predicted point and an actual reported point corresponding to the predicted point; and adjusting the quantity n of predicted points to n' based on the movement speed of the stylus and the error, where n' is a quantity of predicted points in next prediction, and n' is a positive integer. In embodiments of this application, the quantity of predicted points may further be dynamically adjusted based on the movement speed of the stylus and/or the error of the predicted point. This ensures that the predicted point does not deviate from a correct track, so that the user can have better hand-following and handwriting experience when using the stylus.

In a possible implementation, the adjusting the quantity n of predicted points based on the movement speed of the stylus and the error includes: decreasing the quantity n of predicted points when the movement speed of the stylus is less than or equal to a movement speed threshold and/or the error is greater than or equal to an error threshold. In embodiments of this application, when the foregoing condition is met, the quantity of predicted points may be decreased. This ensures that when the user uses the stylus, the predicted point does not excessively deviate from a correct track, and better hand-following and handwriting experience can be provided.

In a possible implementation, the obtaining a plurality of reported points of a stylus includes: collecting touch information of a stylus tip when the stylus is used to perform drawing; and determining the plurality of reported points of the stylus based on the touch information.

In a possible implementation, the drawing the at least one predicted point and displaying the drawn predicted point includes: drawing a line segment by connecting two adjacent predicted points in the n predicted points; and displaying the drawn line segment.

In a possible implementation, the reported point prediction model is a second-order Taylor expansion.

According to a second aspect, a device for predicting a drawn point of a stylus is provided. The device includes a processor, configured to be coupled to a memory, and read and execute instructions stored in the memory. When the processor runs and executes the instructions, the processor is enabled to further obtain a plurality of reported points of a stylus; determine a reported point prediction model based on the plurality of reported points; perform prediction by using the reported point prediction model to obtain at least one predicted point; and draw the at least one predicted point. The device further includes a display, configured to display the drawn predicted point. In embodiments of this application, the reported point prediction model is constructed based on information about historical reported points to obtain the predicted point. The predicted point is drawn and displayed, so that the displayed point is closer to a location of an actual touch point of the stylus than an actual reported point. This ensures that a user can have better hand-following and handwriting experience when using the stylus.

In a possible implementation, the processor is further configured to: determine coordinate information and time information of the plurality of reported points, where the coordinate information includes coordinate information in an X-axis direction and coordinate information in a Y-axis direction; and for each of the X-axis direction and the Y-axis direction, obtain the reported point prediction model in the direction based on coordinate information of the plurality of reported points in the direction and the time information.

In a possible implementation, the processor is further configured to: for each of the X-axis direction and the Y-axis direction, determine coordinate information of n predicted points in the direction based on the reported point prediction model in the direction, where n is a positive integer; and obtain coordinate information of the n predicted points based on the coordinate information of the predicted points in the X-axis direction and the coordinate information of the predicted points in the Y-axis direction.

In a possible implementation, the device further includes a sensor, configured to obtain touch information of the stylus, and obtain the plurality of reported points based on the touch information. The processor is further configured to: determine a movement speed of the stylus based on the plurality of reported points; determine an error between the predicted point and an actual reported point corresponding to the predicted point; and adjust the quantity n of predicted points to n' based on the movement speed of the stylus and the error, where n' is a quantity of predicted points in next prediction, and n' is a positive integer. In embodiments of this application, the quantity of predicted points may further be dynamically adjusted based on the movement speed of the stylus and/or the error of the predicted point. This ensures that when the user uses the stylus, the predicted point does not excessively deviate from a correct track, and better hand-following and handwriting experience can be provided.

In a possible implementation, the processor is further configured to decrease the quantity n of predicted points when the movement speed of the stylus is less than or equal to a movement speed threshold and/or the error is greater than or equal to an error threshold. In embodiments of this application, when the foregoing condition is met, the quantity of predicted points may be decreased. This ensures that when the user uses the stylus, the predicted point does not excessively deviate from a correct track, and better hand-following and handwriting experience can be provided.

In a possible implementation, the sensor is further configured to collect the touch information of a stylus tip when the stylus is used to perform drawing. The processor is further configured to determine the plurality of reported points of the stylus based on the touch information.

In a possible implementation, the processor is further configured to draw a line segment by connecting two adjacent predicted points in the n predicted points. The display is further configured to display the drawn line segment.

In a possible implementation, the reported point prediction model is a second-order Taylor expansion.

According to a third aspect, a computer-readable storage medium is provided. The computer-readable storage medium stores instructions, and when the instructions are run on a terminal, the terminal is enabled to perform the method according to any one of the possible implementations of the first aspect.

According to a fourth aspect, a computer program device including instructions is provided. When the instructions are run on a terminal, the terminal is enabled to perform the method according to any one of the possible implementations of the first aspect.

Embodiments of this application disclose a method and device for predicting a drawn point of a stylus. A possible location of a future reported point is predicted based on historical reported points, and the location of the predicted point is drawn. In this way, the drawn point is closer to a location of an actual touch point of the stylus. This ensures better hand-following and handwriting experience of a user when the user uses the stylus.

DESCRIPTION OF EMBODIMENTS

The following describes the technical solutions in embodiments of this application with reference to accompanying drawings in embodiments of this application.

Figure 1:
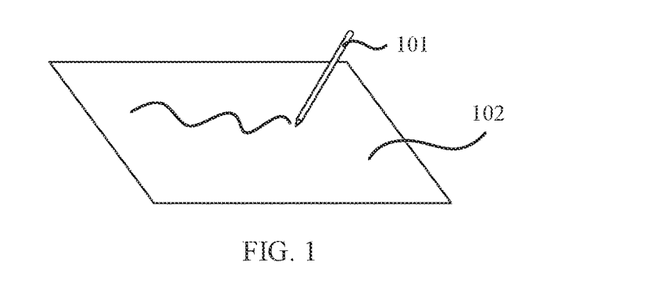
FIG. 1 is a schematic diagram of a stylus drawing scenario according to an embodiment of this application.

This application is mainly applied to a scenario in which a user uses a stylus to write or draw on a mobile device. For example, FIG. 1 is a diagram of a scenario. In this scenario, a user uses a stylus 101 to draw or write on a display 102 of a terminal device. In this case, a corresponding line is displayed on a path of the stylus 101 on the display 102, and the line represents content depicted by the stylus 101. Usually, the stylus 101 draws or writes on the display 102. Therefore, a difference from a case in which content drawn or written on paper by using a common pen can be immediately displayed lies in that the terminal device can draw a corresponding line only after performing calculation based on a touch point of the stylus 101 on the display 102. It is clear that a process in which the terminal device draws the line consumes time. Therefore, when the line drawing is completed, a location of an actual touch point of the stylus 101 may have been moved forward.

Figure 2:
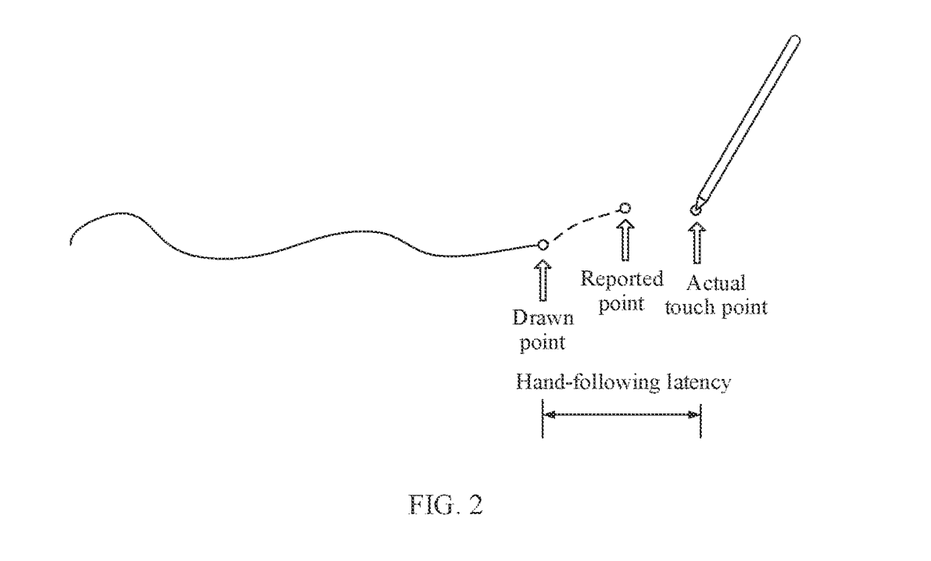
FIG. 2 is a schematic diagram of a hand-following latency of a stylus.

For example, in a schematic diagram of FIG. 2, it is clear that the actual touch point of the stylus and a drawn point are not at a same location. As a result, when the drawn point is drawn and displayed, the actual touch point of the user has been moved forward. For user experience, this means that the stylus does not follow a hand well. The touch point is a point at which the stylus 101 touches the display 102, and the drawn point is a point drawn and displayed on the display by the terminal device based on the touch point. A reason why this phenomenon occurs is that when performing drawing, the terminal device needs to obtain a reported point obtained by a physical layer of the terminal device based on a touch point, then render the reported point to obtain a drawn point, and transmit the drawn point to display the drawn point on the display. It may be understood that the physical layer may also be referred to as a bottom layer, and the foregoing two descriptions in this application are interchangeable.

Figure 3:
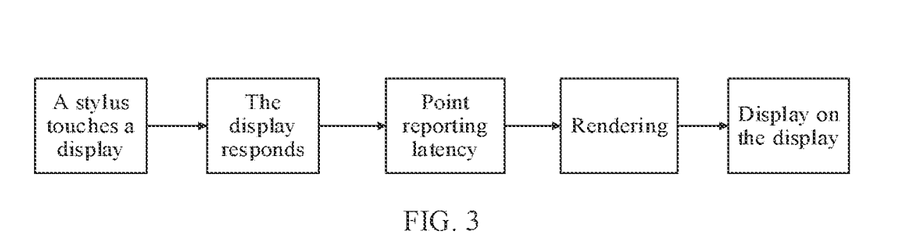
FIG. 3 is a schematic diagram of a stylus drawing and displaying process.

However, after the stylus touches the display, the display needs some time to respond. In addition, there is also a specific latency between a moment at which the display responds and a moment at which the terminal device obtains the reported point from the bottom layer. In other words, there is a point reporting latency. In addition, the terminal device requires a period of processing time to complete rendering the reported point reported by the physical layer, and finally display a rendered reported point on the display. As a result, there is a specific distance between a location of the displayed drawn point and a location of the actual touch point of the stylus. Specifically, for a process in which a latency is generated when the display displays the drawn point, refer to a schematic diagram of FIG. 3.

If the terminal device performs drawing in advance, there is a relatively large deviation between a displayed drawn point and the actual touch point of the stylus. This brings worse hand-following experience to the user.

Therefore, in embodiments of this application, a reported point prediction model is obtained based on a plurality of historical reported points, prediction is performed based on the reported point prediction model, and then a predicted point is drawn and displayed, so that the displayed point is closer to the location of the actual touch point of the stylus than an actual reported point. This ensures that the user can have better hand-following and handwriting experience when using the stylus.

The following describes the technical solutions in embodiments of this application with reference to accompanying drawings in embodiments of this application.

Figure 4:
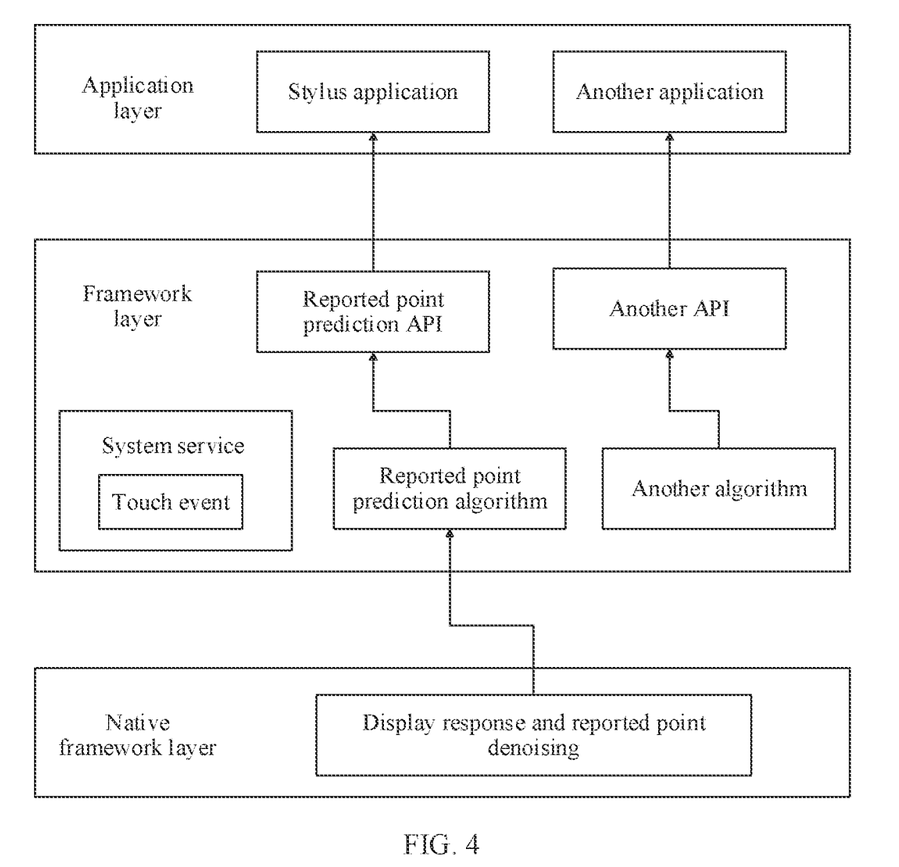
FIG. 4 is a schematic diagram of a system framework according to an embodiment of this application.

FIG. 4 is a schematic diagram of a system framework according to an embodiment of this application.

It can be learned from FIG. 4 that the system architecture may be an Android (Android)-based system architecture, and the architecture includes a native (native) framework layer, a framework (framework) layer, and an application (application, APP) layer. The native layer mainly includes some native services, some link libraries, and the like. The layer can be implemented by using C and C++ languages. The layer is further used to perform drive interaction with underlying hardware. Therefore, a terminal device may respond, by using the layer, to an action that a stylus touches a display, and obtain an initial reported point collected by the display.

In an example, the reported point obtained by the native layer may include coordinate information and absolute time of the point. It may be understood that the absolute time refers to the Coordinated Universal Time or the Greenwich Mean Time. After obtaining the reported point, the native layer of the terminal device may further perform denoising processing on the obtained reported point, and send a reported point obtained after denoising to a reported point prediction algorithm at the framework layer, to obtain a reported point prediction model and a predicted point based on the algorithm. Then, the predicted point is sent to a stylus application at the APP layer through a reported point prediction application programming interface (application programming interface, API).

The framework layer further includes a system service (system server) for providing the framework layer with various services that may be used, for example, a touch event (input flinger). The input flinger is used to provide service support for an event (event) that occurs on the display when the stylus moves on the display. Certainly, the framework layer may further include another algorithm for completing any other possible function, and uploading data to another application at the APP layer through another corresponding API, to complete a specific task.

After receiving the predicted point through the reported point prediction API, the stylus application at the APP layer may render the received predicted point and display a rendered predicted point on the display. In some examples, the stylus application may be, for example, a memo application or a drawing application.

In embodiments of this application, the reported point prediction API and the reported point prediction algorithm are added to the framework layer, so that the stylus application at the APP layer can invoke the reported point prediction algorithm through the reported point prediction API at the framework layer. In this way, a drawn point can be closer to a location of an actual touch point of the stylus when a user uses the stylus application. This ensures better hand-following and handwriting experience when the user uses the stylus.

Figure 5:
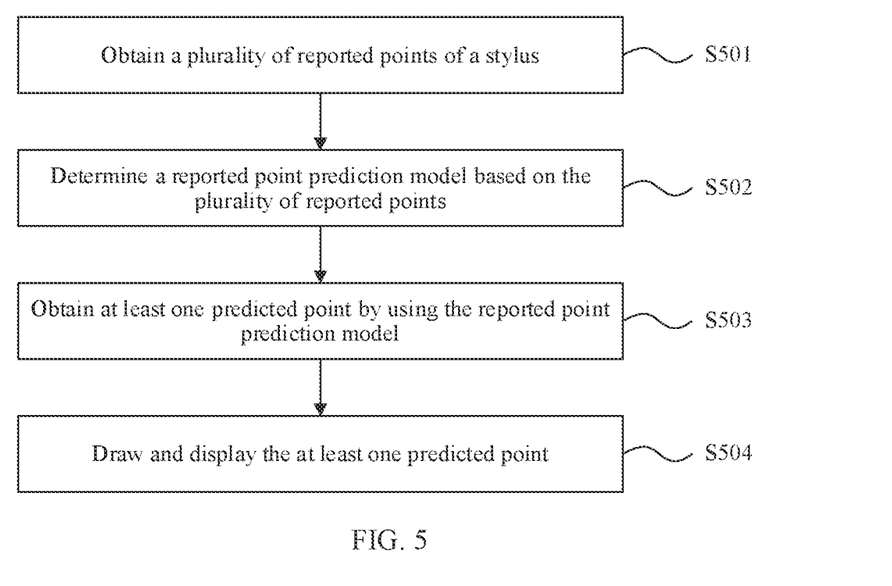
FIG. 5 is a flowchart of a method for predicting a drawn point of a stylus according to an embodiment of this application.

Based on the framework shown in FIG. 4, an embodiment of this application further provides a method for predicting a drawn point of a stylus, for example, as shown in FIG. 5.

The method may be applied to a terminal device. The terminal device in embodiments of this application may be a terminal device having a display, and the display is a display having a touch function. The terminal device may be but is not limited to any terminal device or portable terminal device with a display having a touch function, such as a mobile phone, a wearable device, a tablet computer, a personal digital assistant (personal digital assistant, PDA), a laptop computer (laptop), or a mobile computer. The method may include the following steps.

S501. Obtain a plurality of reported points of a stylus.

The terminal device first obtains the plurality of reported points of the stylus through the display.

In an example, after the stylus touches and slides on the display, the terminal device may obtain the plurality of reported points generated after the stylus touches the display. For example, a reported points may be obtained. For obtaining of the a reported points, in an example, after the stylus touches the display of the terminal device, the terminal device may drive the display, obtain touch information of the display, and determine the reported points based on the obtained touch information. The reported point includes coordinate information and time information. The reported point is reported to a framework layer, continues to be transmitted to an application layer through a corresponding API at the framework layer, and is drawn and displayed on the display by using a corresponding application.

In an example, when the terminal device obtains the plurality of reported points, a frequency at which the display collects touch information may be different from a frequency at which the terminal device obtains reported points. For example, the display may collect 500 points per second when collecting touch information, that is, collect one point every 2 milliseconds (ms). However, the frequency at which the terminal device obtains reported points may be once per 6 ms. Therefore, the display may record the touch information after collecting the touch information, and wait for the terminal device to obtain the touch information according to a preset frequency used by the terminal device. For example, the display stores three pieces of touch information after 6 ms, and the terminal device obtains the three pieces of touch information this time and determines three corresponding reported points based on the three pieces of obtained touch information. Certainly, specific frequencies used by the display and the terminal device may be randomly set according to an actual situation. This is not limited in this application.

It may be understood that, each time the stylus starts to write or draw, the first a reported points may not be predicted, but are normally drawn and displayed by using the terminal device, a is a reference quantity of historical reported points, and may be preset. For example, a may be 10. To be specific, the terminal device obtains 10 latest reported points. Certainly, in another example, a may alternatively be 30. To be specific, the terminal device obtains 30 latest reported points. This is not limited in this application. It is clear that at each initial stage of writing or drawing by the stylus, the quantity of historical reported points may be less than a, and therefore, the terminal device does not perform prediction, but performs subsequent steps only when the quantity of historical reported points reaches a. It may be understood that, the terminal device may collect more than 300 pieces of reported point information per second, and therefore, for example, 30 reported points may be collected in only about 100 milliseconds. If a value of a is 10, the collection may be completed in only more than 30 milliseconds. This is short for a user, and even is not easily perceived. Therefore, no high latency is caused.

Certainly, in some examples, if the quantity of obtained reported points does not reach a, the subsequent steps may alternatively be performed based on the current quantity of obtained reported points. Alternatively, in some other examples, the quantity a may not be limited, but all reported points generated when the stylus is used to write or draw this time are used to perform the subsequent steps.

S502. Determine a reported point prediction model based on the plurality of reported points.

The terminal device determines the reported point prediction model based on the plurality of reported points obtained in S501.

In an example, the terminal device may construct the reported point prediction model in a machine learning manner based on the plurality of reported points obtained in S501. When the user uses the stylus to write or draw on the display, regardless of a manner used, a movement track of the stylus may be finally abstracted as a curve or a straight line, which may be uniformly referred to as a generalized curve. Generally, all reported points received by the terminal device from a bottom layer are discrete points. Therefore, the discrete reported points need to be connected to form a curve. It is clear that the curve can be considered as the movement track of the stylus, and the points on the curve are all reported points on the movement track. Because the movement track of the stylus changes with time, the point on the movement track may be divided into a coordinate in an X-axis direction and a coordinate in a Y-axis direction. Based on each direction, a time-coordinate function in the X-axis direction and a time-coordinate function in the Y-axis direction are constructed. It may be understood that all functions described below need to be constructed separately in the two directions: the X-axis direction and the Y-axis direction.

For example, a Taylor polynomial may be used as a function approximating to any curve. The Taylor polynomial may also be referred to as a Taylor expansion or a Taylor formula. In an example, the Taylor expansion may be used as an initial prediction model, as shown in formula 1:

$$f(t) = f(t_0) + f'(t_0)(t - t_0) + \frac{f''(t_0)}{2!}(t - t_0)^2 + \frac{f'''(t_0)}{3!}(t - t_0)^3 + \ldots + \frac{f^{(n)}(t_0)}{n!}(t - t_0)^n \qquad \text{Formula 1}$$

Figure 6:
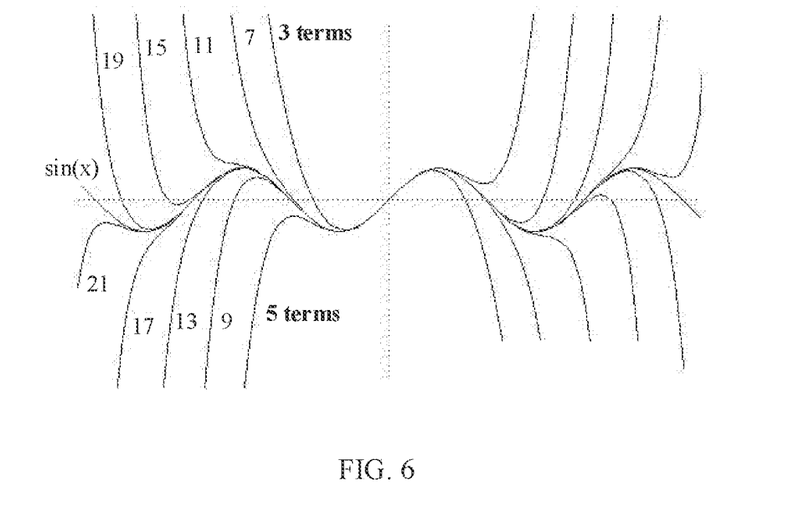
FIG. 6 is a schematic diagram of a fitting relationship between a Taylor expansion and a curve.

For example, FIG. 6 shows a fitting relationship between a Taylor expansion and a curve. It can be seen that when a quantity of terms is 3, 5, 7, 9, 11, 13, 15, 17, 19, or 21, a curve depicted by the formula is closer to an actual curve. It may be understood that if a quantity of terms of the Taylor expansion is larger, f(t) can depict the actual curve more accurately. The quantity of terms is a quantity of terms included in the Taylor expansion.

However, a larger quantity of terms lead to a more complex formula, and a larger calculation amount in the formula. In addition, as the quantity of terms increases, a smooth curve may have more bends. It is clear that when the user uses the stylus to write or draw, a drawn line is usually not expected to have many bends. Therefore, in an example, a second-order Taylor expansion may be used as the reported point prediction model. Because there are only three terms, it can be ensured that a curve of the function is relatively smooth and fits an actual track of the stylus. In addition, the terminal device can further quickly calculate the curve of the function without a high latency.

In this case, the second-order Taylor expansion may be shown in formula 2:

$$f(t) = f(t_0) + f'(t_0)(t - t_0) + \frac{f''(t_0)}{2!}(t - t_0)^2 \qquad \text{Formula 2}$$

that is, $$f(t) = f(t_0) + f'(t_0)(t - t_0) + \frac{f''(t_0)}{2}(t - t_0)^2$$

To be specific, f(t) represents a coordinate in a direction at a time point t. $t_0$ represents time of a latest obtained reported point, and t represents time of a reported point to be predicted, that is, time of a predicted point. In an example, both t and $t_0$ may be represented by absolute time. $t-t_0$ may be represented by $\Delta t$. In other words, $\Delta t$ represents a time difference between the predicted point and the latest obtained reported point. For example, when $\Delta t$ is 2 milliseconds, f(t) represents predicting a location of a predicted point 2 milliseconds after the latest reported point.

In this case, formula 2 may also be equivalent to formula 3, that is, $$f(\Delta t) = s_0 + f'(t_0)\Delta t + 1/2 f''(t_0)\Delta t^2 \qquad \text{Formula 3}$$

$s_0$, that is, $f(t_0)$, represents a coordinate location of the latest obtained reported point. Because f(t) is a function based on the time t, a derivative of a location s at the time t may represent a speed v, and a second-order derivative of the location s at the time t may represent an acceleration a. In this case, formula 3 may also be equivalent to formula 4, that is, $$s_{\Delta t}=s_0+v\Delta t+1/2a\Delta t^2 \quad \text{Formula 4}$$

In this case, the terminal device needs only to obtain the speed v and the acceleration a through calculation in a machine learning manner based on coordinate information and time information of a plurality of obtained historical reported points, to obtain the reported point prediction model sat, that is, $f(\Delta t)$. The coordinate information of the historical reported point includes an X-axis coordinate and a Y-axis coordinate of the reported point. For example, for the X-axis direction or the Y-axis direction, a change rate of coordinates of two adjacent reported points may be calculated based on location information of the plurality of obtained historical reported points, so that a speed v within a time interval between the two adjacent reported points can be obtained. If a derivative within the time interval between the two adjacent reported points is further calculated for the speed v, an acceleration a within the time interval between the two adjacent reported points can be obtained. Certainly, it may be understood that a manner in which the speed v and the acceleration a are obtained through calculation in a machine learning manner may alternatively be any other equivalent existing manner. Details are not described herein.

It may be understood that, in S502, reported point prediction models $s_t$ in the X-axis direction and the Y-axis direction need to be separately determined. To be specific, the terminal device needs to obtain a reported point prediction model $s_{x\Delta t}$ in the X-axis direction based on coordinate information of the plurality of obtained historical reported points in the X-axis direction and the time information, and the terminal device further needs to obtain a reported point prediction model $s_{y\Delta t}$ in the Y-axis direction based on coordinate information of the plurality of obtained historical reported points in the Y-axis direction and the time information. The terminal device may obtain the final reported point prediction model $s_{\Delta t}$ by combining the reported point prediction model $s_{x\Delta t}$ in the X-axis direction and the reported point prediction model $s_{y\Delta t}$ in the Y-axis direction. In this way, X and Y coordinates of the predicted point can be predicted based on the final reported point prediction model $s_{\Delta t}$.

S503. Obtain at least one predicted point by using the reported point prediction model.

The terminal device may perform prediction based on the reported point prediction models in the X-axis direction and the Y-axis direction that are obtained in S502, to obtain the at least one predicted point. In an example, an X-axis coordinate and a Y-axis coordinate of a possible predicted point at a time point t after the current time point to may be obtained based on different values of $\Delta t$, and a location of the predicted point is obtained based on the X-axis coordinate and the Y-axis coordinate. Certainly, if a plurality of different values of $\Delta t$ are used, predicted points at a plurality of different time points may be obtained. For example, n predicted points may be predicted, where n is a positive integer. In an example, the quantity n may be preset.

Certainly, in another example, the quantity n may also dynamically change as the stylus moves. For example, the terminal device may further calculate a movement speed of the stylus by using a corresponding algorithm at the framework layer and based on coordinate information and time information of the reported point obtained at a native layer. It may be understood that for a specific manner of calculating the movement speed of the stylus, refer to an existing manner. Details are not described herein in this application. When the movement speed of the stylus is greater than or equal to a preset movement speed threshold, n may be decreased to n'. For example, n is initially preset to 10. When the movement speed of the stylus is greater than or equal to the preset movement speed threshold, n may be decreased from 10 to 5. Certainly, when the movement speed of the stylus is less than the preset movement speed threshold, a value of n may remain unchanged. Certainly, in still another example, the terminal device may further record first duration in which the movement speed of the stylus is less than the movement speed threshold. When the first duration is greater than or equal to a preset first stable duration threshold, n may be appropriately increased to n". For example, n is initially preset to 10. When the first duration is greater than or equal to the preset first stable duration threshold, n may be increased from 10 to 15. Certainly, a specific increase or decrease amount may be randomly adjusted according to an actual situation. This is not limited in this application.

In another example, the quantity n of predicted points may alternatively be adjusted based on an error between the predicted point and an actual reported point. When the terminal device predicts a location of a predicted point corresponding to a current reported point, if the time t is used as a variable to predict a location of a predicted point after a time period $\Delta t$, after the time period $\Delta t$, the terminal device can definitely obtain a location of an actual reported point at the time point. In this case, the terminal device may compare the location of the actual reported point at the time point with the previously predicted location of the predicted point, to obtain an error between the two locations. When the error is greater than or equal to a preset error threshold, n may be decreased to n'. For example, n is initially preset to 10. When the error is greater than or equal to the preset error threshold, n may be decreased from 10 to 5. Certainly, when the error is less than the preset error threshold, a value of n may remain unchanged. Certainly, in still another example, the terminal device may further record second duration in which the error is less than the preset error threshold. When the second duration is greater than or equal to a preset second stable duration threshold, n may be appropriately increased to n". For example, n is initially preset to 10. When the second duration is greater than or equal to the preset second stable duration threshold, n may be increased from 10 to 15. Certainly, a specific increase or decrease amount may be randomly adjusted according to an actual situation. This is not limited in this application. In an example, a unit of the error threshold may be micrometer, millimeter, or the like. Certainly, another measurement unit may be used as the unit of the error threshold according to an actual situation. This is not limited in this application.

In another example, the quantity n of predicted points may be finally adjusted based on a movement speed of the stylus and an error between a location of an actual reported point and a location of a predicted point. For example, when the movement speed of the stylus is greater than or equal to a preset movement speed threshold or the error is greater than or equal to a preset error threshold, n may be decreased to n'. For example, n is initially preset to 10. When the movement speed of the stylus is greater than or equal to the preset movement speed threshold or the error is greater than or equal to the preset error threshold, n may be decreased from 10 to 5. Only when the movement speed of the stylus is less than the preset movement speed threshold and the error is less than the preset error threshold, a value of n may remain unchanged. Certainly, in another example, the terminal device may further record third duration in which the movement speed of the stylus is less than the preset movement speed threshold and the error is less than the preset error threshold. When the third duration is greater than or equal to a preset third stable duration threshold, n may be appropriately increased to n". For example, n is initially preset to 10. When the third duration is greater than or equal to the preset third stable duration threshold, n may be increased from 10 to 15. Certainly, a specific increase or decrease amount may be randomly adjusted according to an actual situation. This is not limited in this application.

Alternatively, in another example, only when the movement speed of the stylus is greater than or equal to the preset movement speed threshold and the error is greater than or equal to the preset error threshold, n is decreased to n'. For example, n is initially preset to 10. When the movement speed of the stylus is greater than or equal to the preset movement speed threshold and the error is greater than or equal to the preset error threshold, n is decreased from 10 to 5. When the movement speed of the stylus is less than the preset movement speed threshold or the error is less than the preset error threshold, a value of n may remain unchanged. Certainly, in another example, the terminal device may further record fourth duration in which the movement speed of the stylus is less than the preset movement speed threshold or the error is less than the preset error threshold. When the fourth duration is greater than or equal to a preset fourth stable duration threshold, n may be appropriately increased to n". For example, n is initially preset to 10. When the fourth duration is greater than or equal to the preset fourth stable duration threshold, n may be increased from 10 to 15. Certainly, a specific increase or decrease amount may be randomly adjusted according to an actual situation. This is not limited in this application.

It may be understood that n' obtained after n is adjusted is a quantity of predicted points to be predicted in next prediction by the terminal device.

Figure 7:
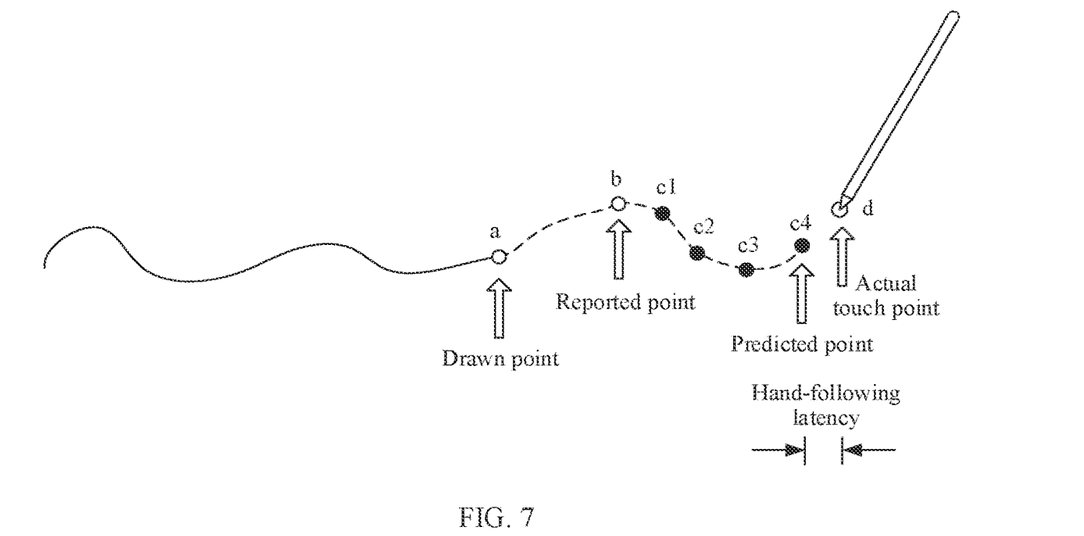
FIG. 7 is a schematic diagram of drawing a predicted point according to an embodiment of this application.

In an example, when the terminal device determines reported point prediction models in different directions based on the historical reported points, for example, the reported point prediction model $s_{x\Delta t}$ in the X-axis direction and the reported point prediction model $s_{y\Delta t}$ in the Y-axis direction, because the foregoing models are time-based functions, the terminal device may predict, based on the reported point prediction models, a reported point $\Delta t$ after the latest reported point. Coordinates of predicted points at different time points are predicted based on different values of $\Delta t$. For example, as shown in FIG. 7, m this case, an obtained latest reported point is a point b. The terminal device may predict coordinate information of predicted points c1, c2, c3, and c4 at different time points by using the reported point prediction model obtained in S502. Certainly, in an example, there may be more predicted points, for example, n predicted points.

Then, error adjustment may be added in the foregoing manner, to help control a quantity of calculated predicted points, so that higher prediction accuracy can be implemented during subsequent prediction.

S504. Draw and display the at least one predicted point.

The terminal device reports the at least one predicted point obtained in S503 to a corresponding stylus application at the application layer, renders the at least one predicted point by using the application, and finally displays a rendered predicted point on the display. In an example, if there are a plurality of predicted points, some of the plurality of predicted points may be drawn, or all predicted points are drawn, and then the drawn predicted points are displayed.

It may be understood that not only points are drawn during drawing. In other words, not only locations of the obtained reported points and the predicted points are drawn. In an example, if a location spacing between the predicted points is relatively long, two adjacent predicted points may be connected, so that the at least one predicted point obtained in S503 is drawn as a line segment and the line segment is displayed on the display. Certainly, the first drawn point may also be connected to the reported point, so that the movement track of the stylus is displayed as a continuous line segment instead of a plurality of separate line segments.

In this case, as shown in FIG. 7, after drawing and displaying, an end point of the line segment displayed on the display is the point c4, and an actual touch point of the stylus is a point d. It can be clearly seen that a distance between the two points is greatly shortened, compared with a distance in FIG. 2. In other words, a hand-following latency is greatly reduced. Certainly, for the purpose of ensuring that the predicted point obtained through prediction does not exceed the actual touch point of the stylus, an upper limit of the quantity of predicted points may be preset. In this way, when the maximum quantity of predicted points is the upper limit of the quantity of predicted points, a location of the predicted point still does not exceed a location of the actual touch point of the stylus.

It can be learned from formula 4 in S502 that in the foregoing process, the terminal device adjusts a polynomial parameter based on speed and acceleration information of the historical reported points, and estimates the predicted point by using the time-based function. It may be understood that when the speed and the acceleration are used as vectors, the speed and the acceleration have corresponding directions. Therefore, when the speed and the acceleration have directions, the terminal device may further learn the polynomial parameter based on information such as a direction, a displacement change, and an angle.

In embodiments of this application, a possible location of a future reported point is predicted based on historical reported points, and the location of the predicted point is drawn. In this way, the drawn point is closer to a location of an actual touch point of the stylus. This ensures better hand-following and handwriting experience of the user when the user uses the stylus.

Figure 8:
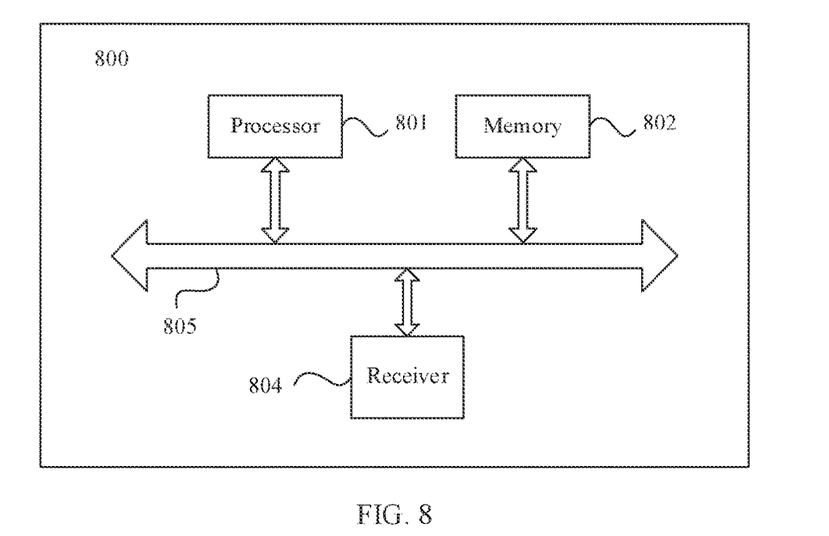
FIG. 8 is a schematic diagram of an apparatus for predicting a drawn point of a stylus according to an embodiment of this application.

FIG. 8 is a schematic diagram of an apparatus for predicting a drawn point of a stylus according to an embodiment of this application.

As shown in FIG. 8, an apparatus 800 for predicting a drawn point of a stylus is provided. The apparatus 800 may include a processor 801, a memory 802, a sensor 803, and a bus 804. The processor 801, the memory 802, and the sensor 803 in the apparatus 800 may establish communication connections through the bus 804.

The processor 801 may be a CPU.

The memory 802 may include a volatile memory (volatile memory), for example, a random-access memory (random-access memory, RAM); or the memory 802 may include a non-volatile memory (non-volatile memory), for example, a read-only memory (read-only memory, ROM), a flash memory, a hard disk drive (hard disk drive, HDD), or a solid state drive (solid state drive, SSD); or the memory 802 may include a combination of the foregoing types of memories.

The sensor 803 may be a display having a touch function. Certainly, the sensor 803 may further include an acceleration sensor, a gyroscope, and the like.

The processor 801 is configured to: be coupled to the memory 802, and read and execute instructions in the memory 802. When the processor 801 runs and executes the instructions, the processor 801 is enabled to further perform S501 and S504 in FIG. 5.

The apparatus 800 may further include a display, configured to display the drawn predicted point in the foregoing method.

An embodiment of this application further provides a chip system. The chip system may be applied to the terminal in the foregoing embodiment, and the chip system includes at least one processor and at least one interface circuit. The processor may be the processor in the foregoing terminal. The processor and the interface circuit may be interconnected through a line. The processor may receive computer instructions from the memory of the electronic device through the interface circuit, and execute the computer instructions. When the computer instructions are executed by the processor, the terminal may be enabled to perform the steps in the foregoing embodiments. Certainly, the chip system may further include another discrete component. This is not specifically limited in embodiments of this application.

An embodiment of this application further provides a computer-readable storage medium, configured to store computer instructions run by the foregoing terminal.

An embodiment of this application further provides a computer program product, including computer instructions run by the foregoing terminal.

A person of ordinary skill in the art may be further aware that, in combination with the examples described in embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraints of the technical solutions. A person skilled in the art may use different methods to implement the described functions for each particular application, but it should not be considered that the implementation goes beyond the scope of this application.

A person of ordinary skill in the art may understand that all or some of the steps in the foregoing method of the embodiments may be implemented by a program instructing a processor. The foregoing program may be stored in a computer-readable storage medium. The storage medium may be a non-transitory (non-transitory) medium, such as a random-access memory, a read-only memory, a flash memory, a hard disk, a solid state drive, a magnetic tape (magnetic tape), a floppy disk (floppy disk), an optical disc (optical disc), or any combination thereof.

The foregoing descriptions are merely preferred specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:
obtaining a plurality of reported points of a stylus;
calculating, based on the reported points, a movement speed of the stylus;
calculating an error between at least one predicted point and an actual reported point corresponding to the at least one predicted point;
setting a maximum quantity of predicted points as an upper limit of predicted points;
adjusting, based on the movement speed and the error, a first quantity of predicted points to a second quantity of predicted points in a next prediction, wherein each of the first quantity and the second quantity is less than the maximum quantity;
dividing the reported points into first coordinates in an X-axis direction and a second coordinates in a Y-axis direction;
generating, based on the first coordinates, a first reported point prediction model in the X-axis direction, wherein the first reported point prediction model is a first curve or a first straight line in the X-axis direction that fits a track of the stylus;
generating, based on the second coordinates, a second reported point prediction model in the Y-axis direction, wherein the second reported point prediction model is a second curve or a second straight line in the Y-axis direction that fits the track of the stylus;
adjusting, after generating the first reported point prediction model and based on speed and acceleration information of the reported points, a first polynomial parameter of the first curve to update the first reported point prediction model;
obtaining, using the updated first reported point prediction model, X coordinates of the at least one predicted point;
adjusting, after generating the second reported point prediction model and based on the speed and acceleration information of the reported points, a second polynomial parameter of the second curve to update the second reported point prediction model;
obtaining, using the updated second reported point prediction model, Y coordinates of the at least one predicted point;
drawing, using the X coordinates and the Y coordinates, the at least one predicted point to obtain a drawn predicted point; and
displaying the drawn predicted point.

2. The method of claim 1, further comprising:
obtaining first coordinate information of the reported points and time information of the reported points, wherein the first coordinate information comprises second coordinate information in the X-axis direction and third coordinate information in the Y-axis direction;
obtaining, for the X-axis direction and based on the second coordinate information and the time information, the second reported point prediction model in the X-axis direction; and
obtaining, for the Y-axis direction and based on the third coordinate information and the time information, a third reported point prediction model in the Y-axis direction.

3. The method of claim 2, further comprising:
predicting, for the X-axis direction and based on the second reported point prediction model, fourth coordinate information of n predicted points in the X-axis direction, wherein n is a positive integer;

predicting, for the Y-axis direction and based on the third reported point prediction model, fifth coordinate information of the n predicted points in the Y-axis direction; and obtaining, based on the fourth coordinate information and the fifth coordinate information, sixth coordinate information of the n predicted points.

4. The method of claim 1, further comprising decreasing the first quantity of predicted points to the second quantity when the movement speed is greater than or equal to a movement speed threshold and when the error is greater than or equal to an error threshold.

5. The method of claim 1, further comprising:
collecting touch information of a stylus tip when the stylus performs drawing; and
obtaining, based on the touch information, the reported points.

6. The method of claim 3, further comprising:
drawing a line segment by connecting two adjacent predicted points in the n predicted points to obtain a drawn line segment; and
displaying the drawn line segment.

7. The method of claim 1, wherein at least one of the first reported point prediction model or the first reported point prediction model is a second-order Taylor expansion.

8. The method of claim 1, further comprising decreasing the first quantity of predicted points to the second quantity when the movement speed is greater than or equal to a movement speed threshold.

9. The method of claim 1, further comprising decreasing the first quantity of predicted points to the second quantity when the error is greater than or equal to an error threshold.

10. A device comprising:
a display; and
at least one processor coupled to the display and configured to:
obtain a plurality of reported points of a stylus;
calculate, based on the reported points, a movement speed of the stylus;
calculate an error between at least one predicted point and an actual reported point corresponding to the at least one predicted point;
set a maximum quantity of predicted points as an upper limit of predicted points;
adjust, based on the movement speed and the error, a first quantity of predicted points to a second quantity of predicted points in a next prediction, wherein each of the first quantity and the second quantity does not exceed the maximum quantity;
divide the reported points into first coordinates in an X-axis direction and a second coordinates in a Y-axis direction;
generate, based on the first coordinates, a first reported point prediction model in the X-axis direction, wherein the first reported point prediction model is a first curve or a first straight line in the X-axis direction that fits a track of the stylus;
generate, based on the second coordinates, a second reported point prediction model in the Y-axis direction, wherein the second reported point prediction model is a second curve or a second straight line in the Y-axis direction that fits the track of the stylus;
adjust, after generating the first reported point prediction model and based on speed and acceleration information of the reported points, a first polynomial parameter of the first curve to update the first reported point prediction model;

obtain, using the updated first reported point prediction model, X coordinates of the at least one predicted point;
adjust, after generating the second reported point prediction model and based on the speed and acceleration information of the reported points, a second polynomial parameter of the second curve to update the second reported point prediction model;
obtain, using the updated second reported point prediction model, Y coordinates of the at least one predicted point;
draw, using the X coordinates and the Y coordinates, the at least one predicted point to obtain a drawn predicted point; and
display, through the display, the drawn predicted point.

11. The device of claim 10, wherein the at least one processor is further configured to:
obtain first coordinate information of the reported points and time information of the reported points, wherein the first coordinate information comprises second coordinate information in the X-axis direction and third coordinate information in the Y-axis direction;
obtain, for the X-axis direction and based on the second coordinate information and the time information, the second reported point prediction model in the X-axis direction; and
obtain, for the Y-axis direction and based on the third coordinate information and the time information, a third reported point prediction model in the Y-axis direction.

12. The device of claim 11, wherein the at least one processor is further configured to:
predict, for the X-axis direction and based on the second reported point prediction model, fourth coordinate information of n predicted points in the X-axis direction, wherein n is a positive integer;
predict, for the Y-axis direction and based on the third reported point prediction model, fifth coordinate information of the n predicted points in the Y-axis direction; and
obtain, based on the fourth coordinate information and the fifth coordinate information, sixth coordinate information of the n predicted points.

13. The device of claim 12, wherein the at least one processor is further configured to:
draw a line segment by connecting two adjacent predicted points in the n predicted points to obtain a drawn line segment; and
display, using the display, the drawn line segment.

14. The device of claim 10, wherein the at least one processor is further configured to decrease the first quantity of predicted points to the second quantity when the movement speed is greater than or equal to a movement speed threshold and the error is greater than or equal to an error threshold.

15. The device of claim 10, wherein the at least one processor is further configured to decrease the first quantity of predicted points to the second quantity when the movement speed is greater than or equal to a movement speed threshold.

16. The device of claim 10, wherein the at least one processor is further configured to decrease the first quantity of predicted points to the second quantity when the error is greater than or equal to an error threshold.

17. The device of claim 10, wherein at least one of the first reported point prediction model or the first reported point prediction model is a second-order Taylor expansion, and wherein the at least one processor is further configured to:

collect touch information of a stylus tip when the stylus performs drawing; and     obtain, based on the touch information, the reported points.

18. A computer program product comprising computer-executable instructions that are stored on a non-transitory computer-readable medium and that, when executed by at least one processor, cause an apparatus to:

obtain a plurality of reported points of a stylus;

calculate, based on the reported points, a movement speed of the stylus;

calculate an error between at least one predicted point and an actual reported point corresponding to the at least one predicted point;

set a maximum quantity of predicted points as an upper limit of predicted points;

adjust, based on the movement speed and the error, a first quantity of predicted points to a second quantity of predicted points in a next prediction, wherein each of the first quantity and the second quantity does not exceed the maximum quantity;

divide the reported points into first coordinates in an X-axis direction and a second coordinates in a Y-axis direction;

generate, based on the first coordinates, a first reported point prediction model in the X-axis direction, wherein the first reported point prediction model is a first curve or a first straight line in the X-axis direction that fits a track of the stylus;

generate, based on the second coordinates, a second reported point prediction model in the Y-axis direction, wherein the second reported point prediction model is a second curve or a second straight line in the Y-axis direction that fits the track of the stylus;

adjust, after generating the first reported point prediction model and based on speed and acceleration information of the reported points, a first polynomial parameter of the first curve to update the first reported point prediction model;

obtain, using the updated first reported point prediction model, X coordinates of the at least one predicted point;

adjust, after generating the second reported point prediction model and based on the speed and acceleration information of the reported points, a second polynomial parameter of the second curve to update the second reported point prediction model;

obtain, using the updated second reported point prediction model, Y coordinates of the at least one predicted point;

draw, using the X coordinates and the Y coordinates, the at least one predicted point to obtain a drawn predicted point; and     display the drawn predicted point.

19. The computer program product of claim 18, wherein the computer-executable instructions, when executed by the at least one processor, further causes the apparatus to decrease the first quantity to the second quantity when the movement speed is greater than or equal to a movement speed threshold.

20. The computer program product of claim 18, wherein the computer-executable instructions, when executed by the at least one processor, further causes the apparatus to decrease the first quantity to the second quantity when the error is greater than or equal to an error threshold.

\* \* \* \* \*